United States Patent
Fujiyoshi et al.

(10) Patent No.: US 6,914,788 B2
(45) Date of Patent: Jul. 5, 2005

(54) POWER SUPPLY APPARATUS

(75) Inventors: Toshikazu Fujiyoshi, Osaka (JP); Kenji Morimoto, Osaka (JP); Satoshi Hamada, Osaka (JP)

(73) Assignee: Sansha Electric Manufacturing Company, Limite, Osaka (JP)

(*) Notice: Subject to any disclaimer, the term of this patent is extended or adjusted under 35 U.S.C. 154(b) by 0 days.

(21) Appl. No.: 10/791,500

(22) Filed: Mar. 2, 2004

(65) Prior Publication Data

US 2004/0174725 A1 Sep. 9, 2004

(30) Foreign Application Priority Data

Mar. 4, 2003 (JP) .......................................... 2003-057060

(51) Int. Cl.$^7$ .............................................. H02M 3/335
(52) U.S. Cl. ........................ 363/16; 363/56.01; 363/131
(58) Field of Search .......................... 363/16, 55, 56.01, 363/123, 131

(56) References Cited

U.S. PATENT DOCUMENTS 4,366,522 A * 12/1982 Baker ........................ 361/91.7
5,383,106 A * 1/1995 Yoshida et al. ............... 363/15
5,535,085 A * 7/1996 Tanaka et al. ................. 361/58

FOREIGN PATENT DOCUMENTS

JP 2001-190060 7/2001

* cited by examiner

Primary Examiner—Adolf Berhane
(74) Attorney, Agent, or Firm—Duane Morris LLP

(57) ABSTRACT

Capacitors (4, 6) are connected in series across a DC power supply (2). IGBTs (8, 10) are connected in series across the DC power supply (2), too. The IGBTs (8, 10) are rendered conductive alternately. A transformer (12) is connected between the junction of the capacitors (4, 6) and the junction of the IGBTs (8, 10). Snubber capacitors (32, 38) are connected in parallel with the IGBTs (8, 10), respectively. Diodes (34, 40) are connected in series with respective ones of the snubber capacitors (32, 38) in such a manner that said snubber capacitors (32, 38) can be charged when the IGBTs (8, 10) are rendered nonconductive. A secondary winding (54SA) of a transformer (54) is connected between the DC power supply (2) and the junction of the snubber capacitor (32) and the diode (34), and converts a secondary voltage of the transformer (12) and returns the converted voltage to the DC power supply (2) when the IGBT (8) is conductive. A secondary winding (54SB) of the transformer (54) is connected between the DC power supply (2) and the junction of the snubber capacitor (38) and the diode (40), and converts a secondary voltage of the transformer (12) and returns the converted voltage to the DC power supply (2) when the IGBT (10) is conductive.

7 Claims, 6 Drawing Sheets

POWER SUPPLY APPARATUS

This invention relates to a power supply apparatus and, more particularly, to a power supply apparatus using an inverter.

BACKGROUND OF THE INVENTION

An example of a prior art DC power supply apparatus with an inverter is disclosed in, for example, Japanese Patent Application Publication No. 2001-190060 A published on Jul. 10, 2001. The power supply apparatus disclosed in this Japanese publication includes a rectifying circuit for rectifying an AC voltage, and a smoothing circuit for smoothing an output voltage of the rectifying circuit into a DC voltage. This DC voltage is, then, switched in an inverter having a switching device which alternates between a conduction state and a nonconduction state. A snubber circuit is used in association with the switching device. The snubber circuit includes a series combination of a diode and a capacitor, and a resistor connected in parallel with the capacitor. When the switching device changes from the conduction state to the nonconduction state, the capacitor of the snubber circuit is charged through the diode, and, when the switching device changes from the nonconduction state to the conduction state, the charge on the capacitor is discharged through the resistor.

Since the voltage increase across the switching device is suppressed by charging of the capacitor when the switching device changes from the conduction state to the nonconduction state, switching loss in the switching device can be reduced. On the other hand, when the switching device changes from the nonconduction state to the conduction state, charge on the capacitor flowing through the resistor is wasted in the form of heat. This decreases efficiency of the circuit and necessitates the use of a larger resistor to reduce generation of heat. This, in turn, causes increase in size of the DC power supply apparatus.

Therefore, an object of the present invention is to provide a DC power supply apparatus with an improved efficiency and with a reduced size.

SUMMARY OF THE INVENTION

A power supply apparatus according to the present invention includes a DC power supply. A series circuit including first and second current conducting devices is connected across the DC power supply. Capacitors or semiconductor switching devices may be used as the first and second current conducting devices.

First and second semiconductor switching devices are connected in series across the DC power supply. The first and second semiconductor switching devices are alternately rendered conductive and nonconductive. A pause interval may be provided between the end of conduction of one of the first and second semiconductor switching devices and the succeeding conduction of the other semiconductor switching device.

A load is connected between the junction of the first and second current conducting devices and the junction of the first and second semiconductor switching devices. As will be described later, the load may include a first transformer with rectifying means connected in a secondary side thereof, or may be a motor, for example.

A first snubber circuit is connected in parallel with the first semiconductor switching device, and includes a first snubber capacitor and a first snubber unidirectionally-conducting device connected in series with the first snubber capacitor in such a manner that the first snubber capacitor can be charged when the first semiconductor switching device is nonconductive. Similarly, a second snubber circuit is connected in parallel with the second semiconductor switching device, and includes a second snubber capacitor and a second snubber unidirectionally-conducting device connected in series with the second snubber capacitor in such a manner that the second snubber capacitor can be charged when the second semiconductor switching device is nonconductive.

A first regenerative circuit is connected between the DC power supply and the first snubber capacitor, and a second regenerative circuit is connected between the DC power supply and the second snubber capacitor. The first regenerative circuit includes first voltage inducing means connected between the junction of the first snubber capacitor and the first snubber unidirectionally conducting device and the DC power supply. The first voltage inducing means converts the voltage across the load and applies it to the first regenerative circuit when the first semiconductor switching device is conductive. The second regenerative circuit includes second voltage inducing means connected between the junction of the second snubber capacitor and the second snubber unidirectionally conducting device and the DC power supply. The second voltage inducing means converts the voltage across the load and applies it to the second regenerative circuit when the second semiconductor switching device is conductive.

With the above-described arrangement of a power supply apparatus, when the first and second semiconductor switching devices are nonconductive, the first and second snubber capacitors are charged, respectively, which suppresses voltage increase across each of the first and second semiconductor switching devices. When the first and second semiconductor switching devices are rendered conductive, the charge on the first and second snubber capacitors are regeneratively returned to the DC power supply through the first and second regenerative circuits, respectively. Accordingly, the efficiency of an inverter, which includes the first and second semiconductor switching devices and the first and second current conducting devices, can be improved. In addition, this arrangement can eliminate the necessity for using large resistors, which would be required if the above-described arrangement of the prior art power supply apparatus were adopted, in order to dissipate charge on the first and second snubber capacitors. This enables downsizing of the inverter. Furthermore, since the first and second voltage inducing means utilize the load voltage as their regenerative voltage supply, any additional regenerative voltage supply is not required.

As described above, the load may include a first transformer with rectifying means connected in its secondary side. With this arrangement, the load may be driven from a DC supply, and, therefore, the power supply apparatus can be used as a DC power supply apparatus for use with a welder, for example.

A series combination of a unidirectionally conducting device and a reactor may be connected in series with each of the first and second voltage inducing means. With this arrangement, current oscillations are produced by the snubber capacitor and the reactor, which, however, are regeneratively returned to the DC supply side.

The first and second voltage inducing means may be secondary windings of a second transformer. The primary winding of the second transformer is connected to the secondary winding of the first transformer. The leakage reactance of the secondary windings is used as the reactors. With this arrangement, since transformer leakage inductance is utilized, an additional reactor is not required, which leads downsizing of the power supply apparatus.

The first and second voltage inducting means may be two secondary windings of the first transformer sharing a common core. Since the first and second voltage inducing means are provided by a transformer with a common core, the power supply apparatus as a whole can be downsized.

The first and second voltage inducing means and the primary winding of the first transformer may share a common core. With this arrangement, since a common transformer can be used as the first and second transformers, the power supply apparatus can be downsized.

First and second unidirectionally conductive devices may be connected in anti-parallel with the first and second semiconductor switching devices, respectively.

BRIEF DESCRIPTION OF THE DRAWINGS

Throughout the drawings, the same or similar reference numerals and symbols are used for the same or similar components or signals.

DESCRIPTION OF EMBODIMENTS

Figure 1:
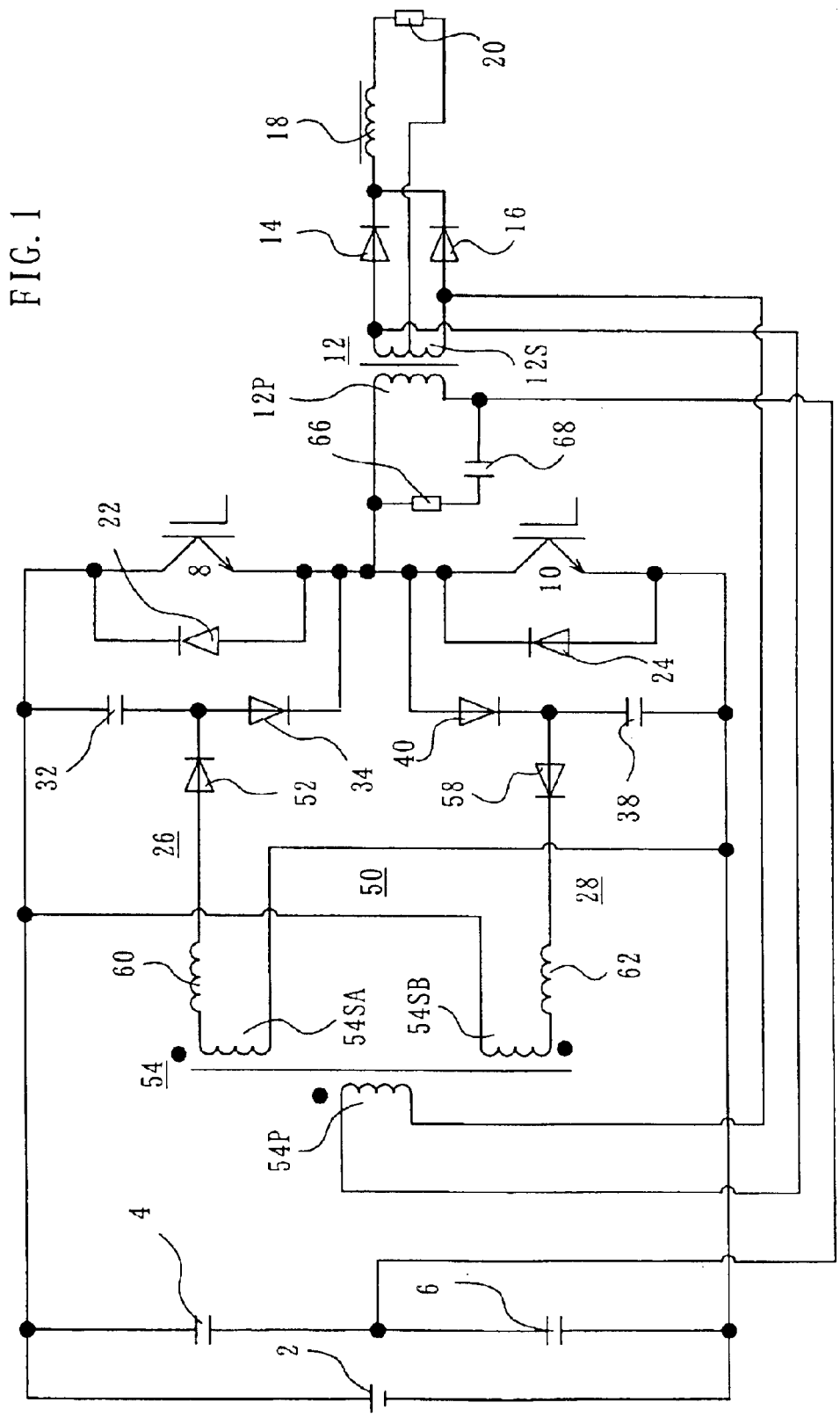
FIG. 1 is a circuit diagram of a power supply apparatus according to a first embodiment of the present invention.

A power supply apparatus according to a first embodiment of the present invention is shown in FIG. 1. The DC power supply apparatus has a DC power supply 2, which may be provided by, for example, rectifying commercial AC power and smoothing the resultant rectified power. A series combination of first and second current conducting devices, e.g. capacitors 4 and 6, are connected between the plus and minus terminals of the DC power supply 2. Also connected across the DC power supply 2 is a series combination of semiconductor switching devices, e.g. IGBTs 8 and 10. Specifically, the conduction paths, e.g. the collector-emitter conduction paths, of the IGBTs 8 and 10 are serially connected between the plus and minus terminals of the DC power supply 2. The gates of the IGBTs 8 and 10 are alternately supplied with control signals from control means, e.g. a control circuit (not shown). A pause interval is provided between application of the control signal to one IGBT and application of the control signal to the other IGBT. Each of the IGBTs 8 and 10 are rendered conductive when it is being supplied with the control signal at its gate.

A primary winding 12P of a transformer 12 is connected between the junction of the capacitors 4 and 6 and the junctions of the collector-emitter conduction paths of the IGBTs 8 and 10. Rectifying means, diodes 14 and 16, for example, are connected to respective ends of the secondary winding 12S of the transformer 12. The anodes of the diodes 14 and 16 are connected to the respective ends of the secondary winding 12S, and, the cathodes are connected together to one end of a load 20 through smoothing means, a smoothing reactor 18, for example. The other end of the load 20 is connected to an intermediate tap of the secondary winding 12S. The capacitors 4 and 6 and the IGBTs 8 and 10 form a what-is-called half-bridge inverter. The transformer 12, the diodes 14 and 16, the smoothing reactor 18, and the load 20 form a load circuit.

First and second unidirectionally conducting devices, e.g. free wheel diodes 22 and 24, are connected in anti-parallel with the collector-emitter conduction paths of the IGBTs 8 and 10, respectively. Also, snubber circuits 26 and 28 are connected in parallel with the IGBTs 8 and 10, respectively.

The snubber circuit 26 includes a capacitor 32, which has its one end connected to the collector of the IGBT 8 and has its other end connected to a unidirectionally conducting device, a diode 34, for example. Specifically, the anode of the diode 34 is connected to the other end of the capacitor 32, and the cathode is connected to the emitter of the IGBT 8. The snubber circuit 28 has a similar arrangement to the snubber circuit 26 and is formed of a capacitor 38 and a diode 40, as shown.

The DC power supply apparatus has a regenerative circuit 50. The regenerative circuit 50 includes a unidirectional device, e.g. a diode 52, connected to the junction of the snubber capacitor 32 and the anode of the diode 34. Specifically, the cathode of the diode 52 is connected to the junction of the snubber capacitor 32 and the anode of the diode 34. The anode of the diode 52 is connected to the minus terminal of the DC power supply 2 through a reactor 60 and first voltage inducting means, e.g. a secondary winding 54SA of another or second transformer 54, to thereby complete a first path of the regenerative circuit 50. Leakage inductance of the secondary winding 54SA may be used as the reactor 60.

The regenerative circuit 50 includes also a unidirectional device, a diode 58, for example, connected to the junction of the cathode of the diode 40 of the snubber circuit 28 and the snubber capacitor 38. Specifically, the anode of the diode 58 is connected to the junction of the diode 40 and the capacitor 38, and the cathode of the diode 58 is connected to the plus terminal of the DC power supply 2 through a reactor 62 and second voltage inducing means, e.g. another secondary winding 54SB of the second transformer 54, to thereby complete a second path of the regenerative circuit 50. Leakage inductance of the secondary winding 54SB may be used as the reactor 62.

A primary winding 54P of the transformer 54 is connected across the secondary winding 12S of the transformer 12. The primary winding 54P and the secondary windings 54SA and 54SB of the transformer 54 are wound on a common core.

A series combination of a resistor 66 and a capacitor 68 is connected across the primary winding 12P of the first transformer 12. This series combination provides a damping circuit, which suppresses parasitic oscillations generated by the parasitic capacitance of the IGBTs 8 and 10 and the leakage inductance of the first transformer 12.

The voltages developed across the secondary windings 54SA and 54SB of the second transformer 54 are transformed versions of the voltage across the secondary winding 12S of the first transformer 12. The winding ratios of the secondary windings 54SA and 54SB to the primary winding 54P of the second transformer 54 are set to develop, across each of the secondary windings 54SA and 54SB, a voltage having a magnitude of one half of the voltage E1 provided by the DC power supply 2. The secondary windings 54SA and 54SB are oppositely poled. Specifically, the secondary winding 54SA is wound in such a sense that when the IGBT 8 is conducting, the diode 52 is rendered conductive. The secondary winding 54SB is wound in such a sense that when the IGBT 10 is conducting, the diode 58 is rendered conductive. Thus, when the diode 52 is conducting, the diode 58 is placed in a blocking state, and when the diode 58 is conducting, the diode 52 is placed in a blocking state.

Figure 2:
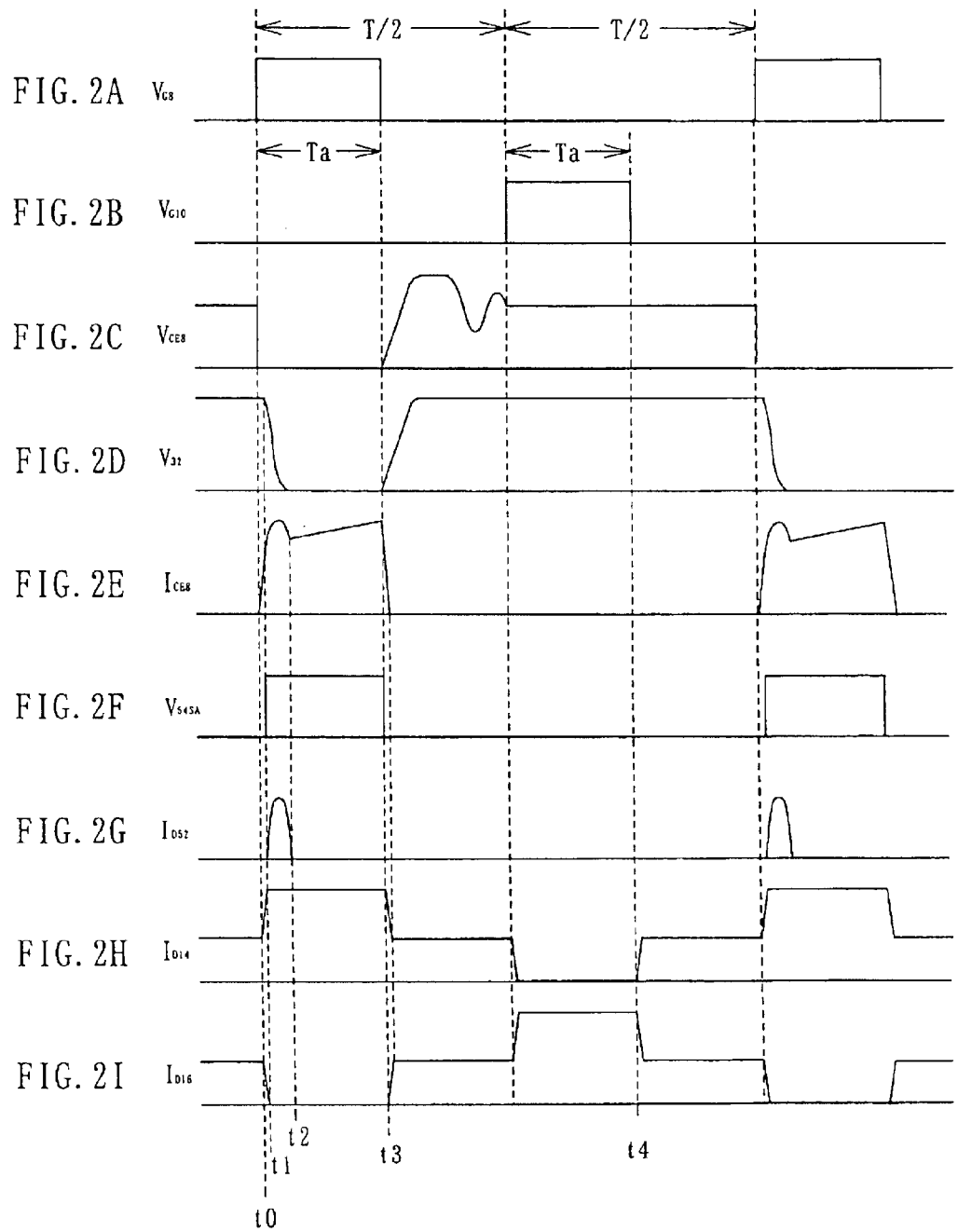
FIGS. 2A through 2I are waveforms at various portions of the power supply apparatus shown in FIG. 1.

Referring to FIGS. 2A through 2I, which shows signals at various portions of the circuit shown in FIG. 1, let it be assumed that, before a time $t_0$, neither of the control signals $V_{G8}$ and $V_{G10}$ shown in FIGS. 2A and 2B, respectively, is applied to the gate of the IGBTs 8 and 10, that a voltage equal to E1, which is the voltage available from the DC power supply 2 is applied between the collector and emitter of the IGBT 8, and that the voltage across the snubber capacitor 32 is also E1. The voltage E1 is applied between the collector and emitter of the IGBT 8 due to the leakage inductance and exciting inductance of the transformer 12. Since the IGBTs 8 and 10 are driven with a phase difference of 180°, the voltages across the capacitors 4 and 6 are maintained to be one-half of the voltage E1.

At the time $t_0$, the control signal $V_{G8}$ is applied to the IGBT 8, as shown in FIG. 2A, to render the IGBT 8 conductive, which results in a load current flowing from the positive plate of the capacitor 4 through the collector-emitter conduction path of the IGBT 8 and the primary winding 12P of the transformer 12 to the negative plate of the capacitor 4.

At a time $t_1$, when a voltage of E1/2 (i.e. one-half of E1) is developed in the secondary winding 54SA, a combined value of the voltage $V_{32}$ across the capacitor 32, shown in FIG. 2D, and the voltage $V_{54SA}$ across the secondary winding 54SA, shown in FIG. 2F, is higher than the voltage E1 of the DC power supply 2 by one-half of the voltage E1, and, therefore, the charge on the capacitor 32 is discharged to the DC power supply 2 through the reactor 60, the transformer 54 and the diode 52. This is an oscillation due to the snubber capacitor 32 and the reactor 60, and, the energy stored in the snubber capacitor 32 is all returned to the DC power supply 2. This eliminates energy consumption in the form of heat, which would otherwise be caused by discharge current flowing through resistance, for example. Thus, the efficiency of the power supply apparatus is improved. Furthermore, since need for using a heat-resistant, large resistor is eliminated, the power supply apparatus can be downsized.

The discharging current flows through the snubber capacitor 32 and the reactor 60, and, therefore, it is sinusoidal. The positive polarity portion ($I_{D52}$) of the current is discharged through the diode 52, and the discharge ends at a time $t_2$. This current causes current to flow from the primary winding 54P of the transformer 54 to the secondary winding 12S of the transformer 12. As a result, the primary current in the primary winding 12P of the transformer, i.e. the collector current of the IGBT 8, increases. In other words, the discharge current is current-transformed by the transformers 54 and 12, and the transformed current is added to the collector current of the IGBT 8. FIGS. 2E and 2G show the current $I_{CE8}$ flowing through the IGBT 8 and the discharge current $I_{D52}$ flowing through the diode 52, respectively.

The control voltage VG8 is removed from the gate of the IGBT 8 at a time $t_3$, so the IGBT 8 is rendered nonconductive. At this time, the charging of the snubber capacitor 32 starts, and the charging current flows through the capacitor 32 and the primary winding 12P. The voltage $V_{CE8}$ between the collector and emitter of the IGBT 8 increases gradually with the charging of the snubber capacitor, as shown in FIG. 2C. Since the collector-emitter voltage $V_{CE8}$ of the IGBT 8 increases gradually, the turn-off loss in the IGBT 8 can be suppressed.

The voltage $V_{32}$ across the snubber capacitor 32 tends to increases to a value higher than the supply voltage E1 since a transient current is flowing through an LC circuit formed of the capacitor 32 and the leakage inductance of the primary winding 12P of the transformer 12. However, the freewheel diode 24 connected in anti-parallel relation with the IGBT 10 is rendered conductive at this time, to thereby clamp the collector-emitter voltage of the IGBT 8 to the voltage E1 provided by the DC power supply 2. Therefore the voltage $V_{32}$ across the snubber capacitor 32 cannot increase to a value larger than the voltage E1 of the DC power supply 2.

There is a time interval during which both of the diodes 14 and 16 are simultaneously conducting when each of the IGBTs 8 and 10 is turned ON or OFF. This is caused by the leakage inductance of the transformer 12. Also, there is a time interval during which both the diodes 14 and 16 are simultaneously conducting when both of the IGBTs 8 and 10 are in the nonconduction state, i.e. during a pause interval. This is caused by the inductance of the smoothing reactor 18. FIG. 2H shows a waveform of the current $I_{D14}$ flowing through the diode 14, and FIG. 2I shows a waveform of the current $I_{D16}$ flowing through the diode 16.

In the interval during which both diodes 14 and 16 are conducting, the voltage across the secondary winding 12S of the transformer 12 is zero (0), and, therefore, in this time period, the voltage $V_{54SA}$ across the secondary winding 54SA of the transformer 54 is also zero (0). Accordingly, even if voltage oscillations occur in the primary winding 12P of the transformer 12 due to the leakage inductance of the transformer 12 at a time $t_4$, at which the IGBT 10 is turned OFF, such voltage oscillations are not transferred to the secondary winding 54SA of the transformer 54. Therefore, unnecessary charging or discharging of the snubber capacitor 32, which would otherwise be caused by such voltage oscillations, can be avoided, and the energy stored in the snubber capacitor 32 is efficiently returned to the DC power supply 2. FIG. 2F shows the waveform of the voltage $V_{54SA}$ across the secondary winding 54SA of the transformer 54.

Operation similar to the described one takes place when the IGBT 10 is turned ON and OFF, except that the phase is different by 180° from the operations of the IGBT 8. Therefore an explanation of the apparatus for the IGBT 10 is not given.

Figure 3:
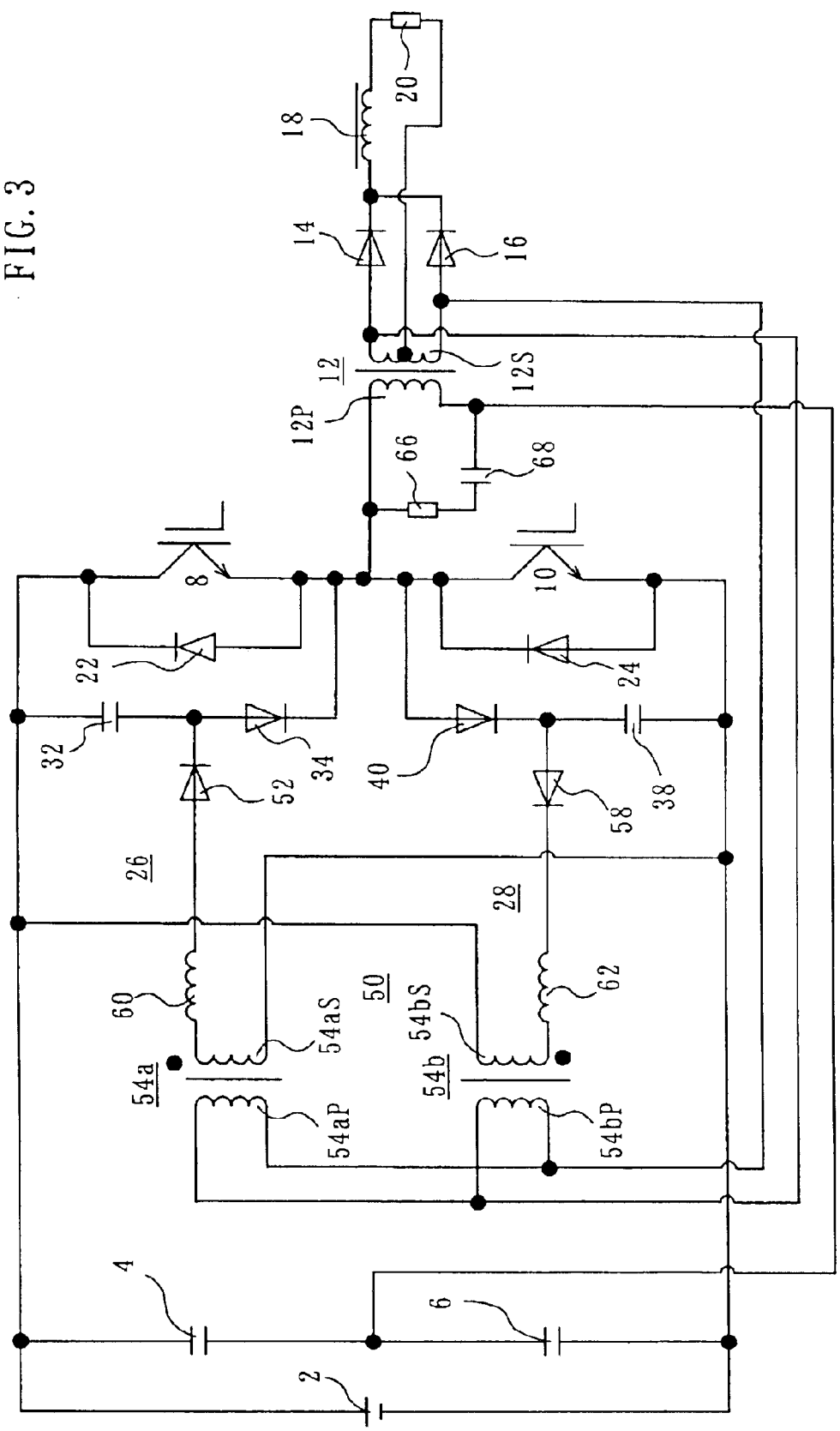
FIG. 3 is a circuit diagram of a power supply apparatus according to a second embodiment of the present invention.

FIG. 3 shows a power supply apparatus according to a second embodiment of the present invention, which includes separate transformers 54a and 54b in the first and second paths of the regenerative circuit 50. Transformers 54a and 54b have respective primary windings 54aP and 54bP, which are connected in parallel with each other. The parallel combination is connected across the secondary winding 12S of the transformer 12. The remaining portions of the apparatus shown in FIG. 3 have the same configuration as the one shown in FIG. 1, and, therefore, no detailed description is given.

Figure 4:
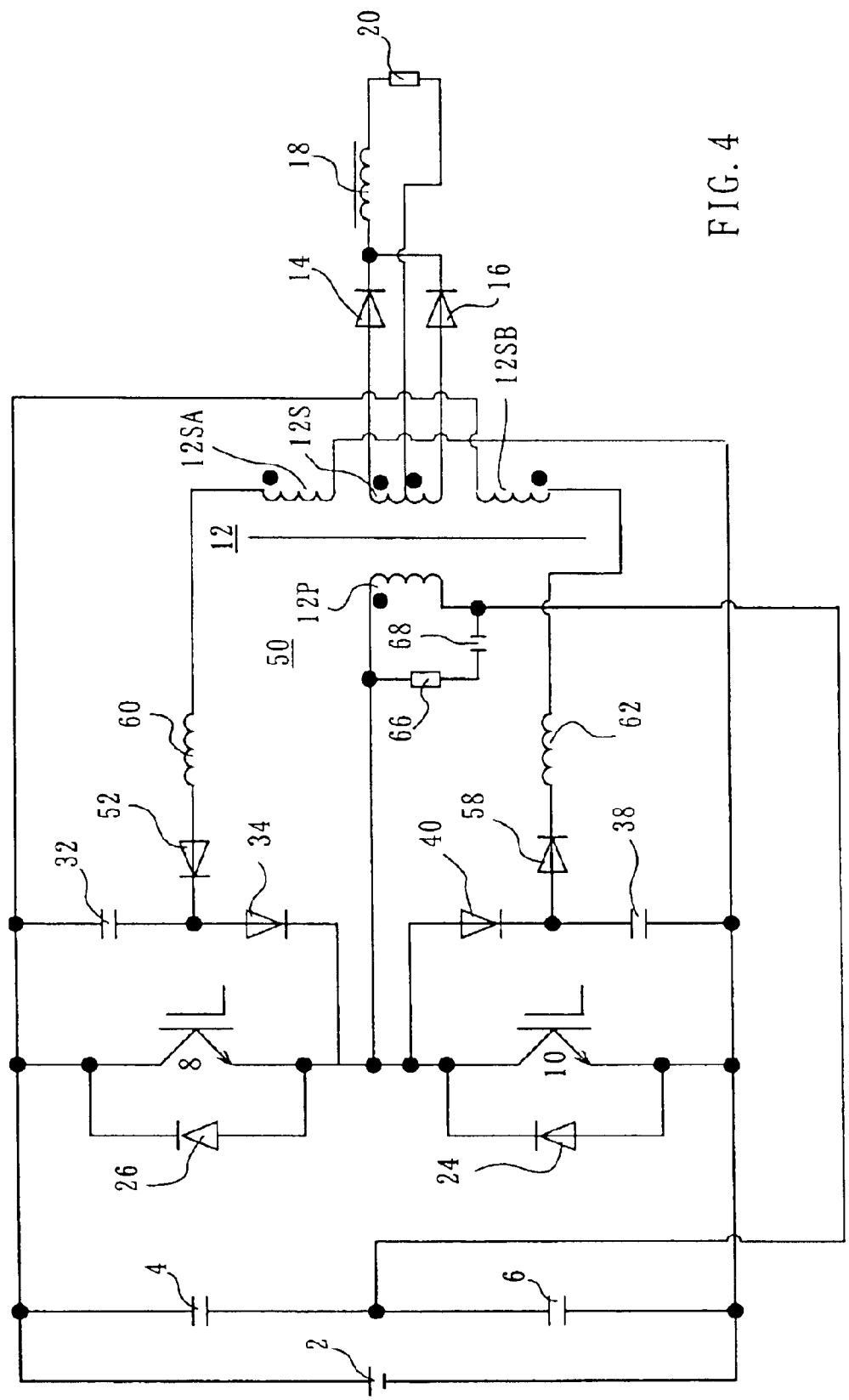
FIG. 4 is a circuit diagram of a power supply apparatus according to a third embodiment of the present invention.

A power supply apparatus according to a third embodiment is shown in FIG. 4. The power supply apparatus shown in FIG. 4 use the same core and the same primary winding in common to the transformers 12 and 54 of the apparatus according to the first embodiment shown in FIG. 1. The power supply apparatus according to the third embodiment of FIG. 4 has the same configuration as that of the one shown in FIG. 1, except that the secondary windings 54SA and 54SB of the transformer 54 are replaced by secondary windings 12SA and 12SB of the transformer 12.

Figures 5A, 5B:
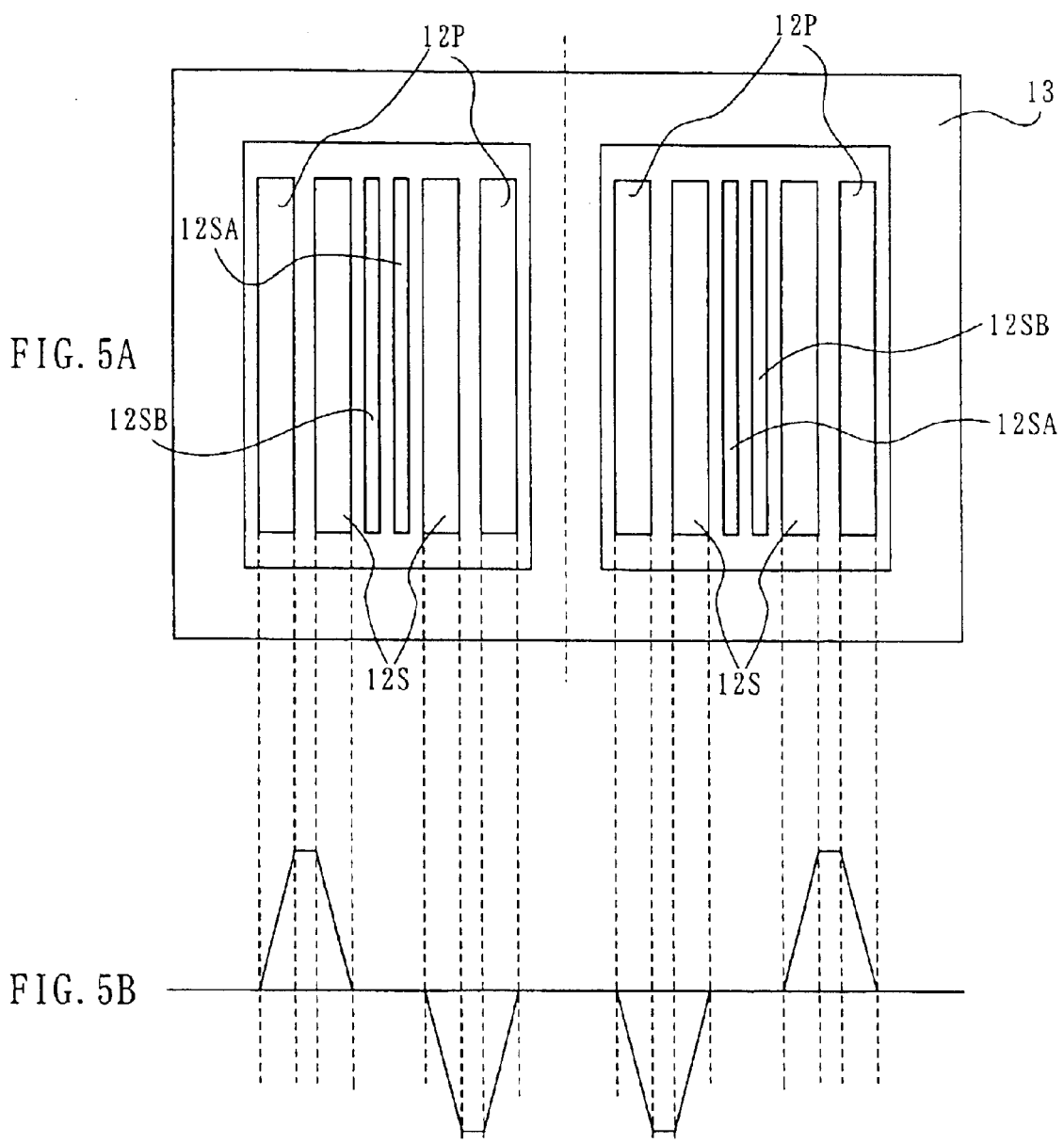
FIGS. 5A and 5B illustrate a winding arrangement and magnetic flux distribution, respectively, of a transformer used in the power supply apparatus of FIG. 4.

FIG. 5A is a schematic cross-sectional view of the transformer 12 used in the power supply apparatus according to the third embodiment shown in FIG. 4, illustrating how the respective coils are configured, and FIG. 5B shows the leakage flux distribution between the primary winding 12P and secondary winding 12S of the transformer 12.

One-half of the primary winding 12P is wound around the core 13. Then, one-half of the secondary winding 12S, the secondary winding 12SA, the secondary winding 12SB, the remaining one-half of the secondary winding 12S, and the remaining one-half of the primary winding 12P are wound in the named order around the core 13. The secondary windings 12SA and 12SB are disposed at locations where they are not influenced by the leakage flux between the primary windings 12P and 12S.

The secondary winding 12S of the transformer 12 used in the power supply apparatus of the third embodiment shown in FIG. 4 is short-circuited when both of the diodes 14 and 16 are conductive. The secondary windings 12SA and 12SB sandwiched between the two halves of the short-circuited secondary winding 12S are not affected by the leakage flux of the secondary winding 12S. Therefore, if voltage fluctuations are induced in the secondary winding 12S of the transformer 12 at the time $t_4$ (FIG. 2), at which the IGBT 10 is switched to the nonconductive state, due to the voltage fluctuations in the primary winding 12P generated by the leakage inductance of the transformer 12, they are not transferred to the secondary winding 12SA. Accordingly, unnecessary charging and discharging of the capacitor 32 otherwise caused by such voltage fluctuations can be eliminated. As a result, effects similar to the ones obtained in the power supply apparatus shown in FIG. 1 which adopts the transformer 54 in the regenerative circuit.

Figure 6:
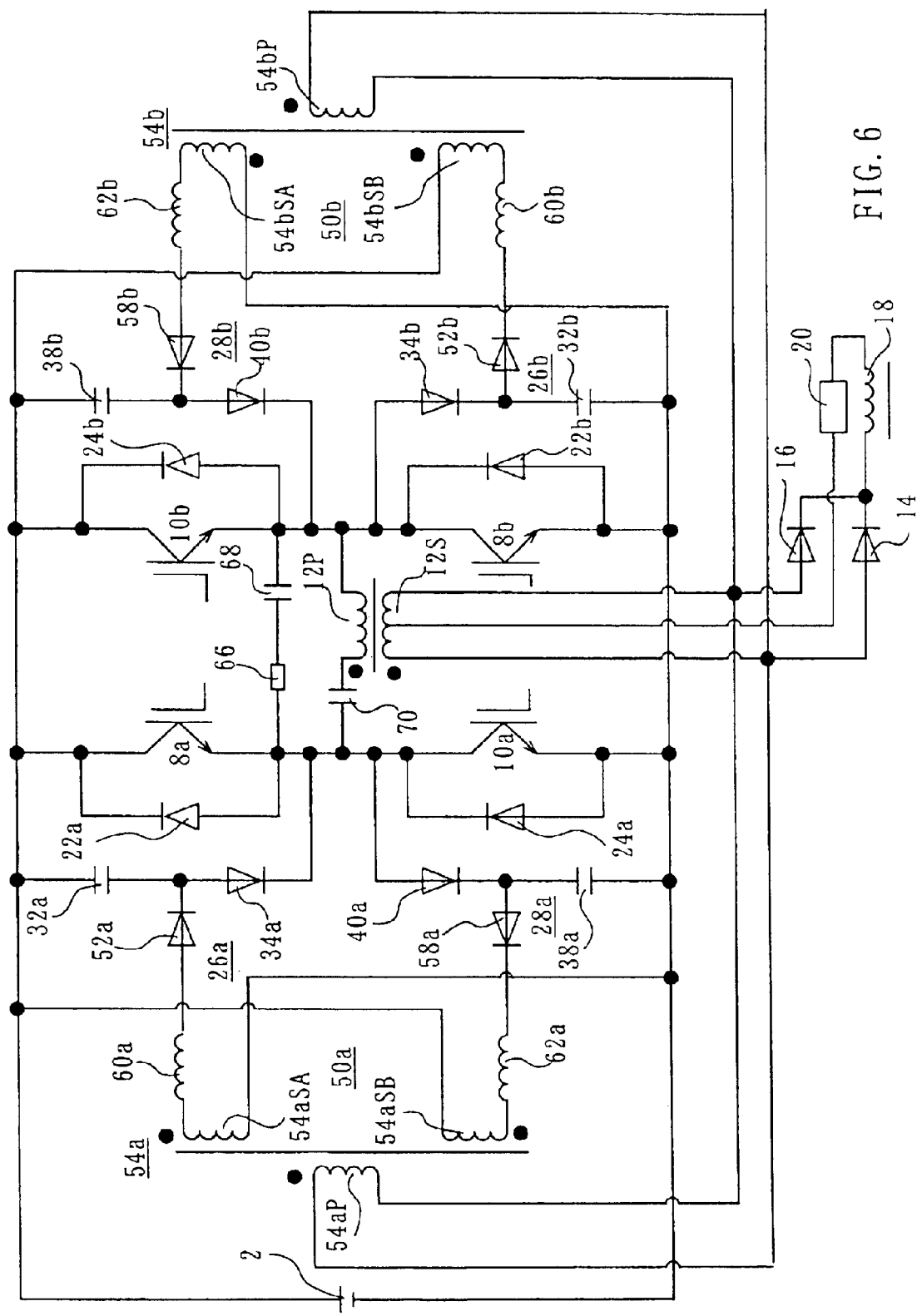
FIG. 6 is a circuit diagram of a power supply apparatus according to a fourth embodiment of the present invention.

FIG. 6 shows a power supply apparatus according to a fourth embodiment of the invention. The power supply apparatus shown in FIG. 6 uses, as the first and second semiconductor switching devices, IGBTs 8a and 10a, and also uses, as the series combination of the first and second current conducting devices, a series combination of IGBTs 8b and 10b. The IGBTs 8a and 8b operate in phase with each other, while the IGBTs 10a and 10b operate in phase with each other but in 180° out-of-phase with the IGBTs 8a and 8b. The power supply apparatus according the fourth embodiment uses snubber circuits 26a and 26b and snubber circuits 28a and 28b similar to the snubber circuits 26 and 28 of the power supply apparatus shown in FIG. 1, and regenerative circuits 50a and 50b similar to the regenerative circuit 50 shown in FIG. 1, which form a what-is-called full-bridge inverter. The components with reference numerals with a suffix "a" or "b" added are components similar to the ones with the same reference numerals without "a" or "b" shown in FIG. 1, and, therefore, their description is not given.

A capacitor 70, shown in FIG. 6, connected in series with the primary winding 12P of the transformer 12 functions to prevent DC components from being applied to the primary winding 12P.

When the IGBTs 8a and 8b are rendered conductive, current flows from the positive terminal of the DC power supply 2 through the IGBT 8a, the capacitor 70, the primary winding 12P of the transformer 12 and the IGBT 8b to the negative terminal of the DC power supply 2. When the IGBTs 10a and 10b are rendered conductive, current flows from the positive terminal of the DC power supply 2 through the IGBT 10b, the primary winding 12P of the transformer 12, the capacitor 70 and the IGBT 10a to the negative terminal of the DC power supply 2.

Thus, same as in the power supply apparatuses according to the first through third embodiments described above, in which a half-bridge inverter is used, current having alternating polarity flows in the primary winding 12P of the transformer 12. Snubber circuits and regenerative circuits twice in number as large as the snubber and regenerative circuits used in the power supply apparatus shown in FIG. 1 are used in the power supply circuit according to the fourth embodiment shown in FIG. 6, since the number of IGBTs used in the inverter is twice as large as that in the power supply apparatus of FIG. 1. However, since operations of the individual components and circuits are similar to the ones of the power supply apparatus of FIG. 1, they are not described.

The power supply apparatus has been described as a DC power supply apparatus providing DC power by converting a high-frequency voltage produced by an inverter into a DC voltage, but the high-frequency voltage from the inverter may be used to drive a motor, for example. Instead of IGBTs, other semiconductor devices, such as bipolar transistors and power FETs may be used as the semiconductor switching devices. Further, the damping circuit formed of a series combination of the resistor 66 and the capacitor 68 may be eliminated in some cases. Also, a capacitor may be connected in parallel with the load 20.

What is claimed is:

1. A power supply apparatus comprising:
   a DC power supply;
   a series circuit including first and second current conducting devices connected in series across said DC power supply;
   first and second semiconductor switching devices connected in series across said DC power supply and adapted to be alternately rendered conductive;
   a load circuit connected between the junction of said first and second current conducting devices and the junction of said first and second semiconductor switching devices;
   a first snubber circuit connected in parallel with said first semiconductor switching device, said first snubber circuit comprising a first snubber capacitor and a first snubber unidirectionally conducting device connected in series with said first snubber capacitor in such a manner that said first snubber capacitor can be charged when said first semiconductor switching device is nonconductive;
   a second snubber circuit connected in parallel with said second semiconductor switching device, said second snubber circuit comprising a second snubber capacitor and a second snubber unidirectionally conducting device connected in series with said second snubber capacitor in such a manner that said second snubber capacitor can be charged when said second semiconductor switching device is nonconductive;
   a first regenerative circuit connected between said DC power supply and said first snubber capacitor; and
   a second regenerative circuit connected between said DC power supply and said second snubber capacitor;
   said first regenerative circuit being connected between the junction of said first snubber capacitor and said first snubber unidirectionally conducting device and said DC power supply, and including first voltage inducing means for converting a voltage across said load circuit and supplying a converted voltage to said first regenerative circuit when said first semiconductor switching device is conductive;

said second regenerative circuit being connected between the junction of said second snubber capacitor and said second snubber unidirectionally conducting device and said DC power supply, and including second voltage inducing means for converting a voltage across said load circuit and supplying a converted voltage to said second regenerative circuit when said second semiconductor switching device is conductive.

2. The power supply apparatus according to claim 1 wherein said load circuit includes a first transformer with rectifying means disposed in a secondary side thereof.

3. The power supply apparatus according to claim 1 further comprising a series combination of a unidirectionally conducting device and a reactor connected to each of said first and second voltage inducing means.

4. The power supply apparatus according to claim 3 wherein said first and second voltage inducing means are secondary windings of a second transformer, and said reactors are provided by leakage inductance of said secondary windings of said second transformer.

5. The power supply apparatus according to claim 2 wherein said first and second voltage inducing means are secondary windings of said first transformer sharing a common core.

6. The power supply apparatus according to claim 2 wherein said first and second voltage inducing means and a primary winding of said first transformer share a common core.

7. The power supply apparatus according to claim 1 wherein first and second unidirectionally conducting devices are connected in anti-parallel relation with said first and second semiconductor switching devices, respectively.

* * * * *